United States Patent
Bronson

(10) Patent No.: US 7,091,929 B2
(45) Date of Patent: Aug. 15, 2006

(54) METHOD AND APPARATUS FOR DISPLAYING IMAGES

(75) Inventor: Barry Bronson, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 751 days.

(21) Appl. No.: 09/809,213

(22) Filed: Mar. 16, 2001

(65) Prior Publication Data
US 2002/0130821 A1    Sep. 19, 2002

(51) Int. Cl.
*G09G 5/00*   (2006.01)

(52) U.S. Cl. ............................................. 345/8; 345/9

(58) Field of Classification Search ............... 345/2, 345/2.2, 3.2, 3.3, 7–9; 348/744; 349/6–15; 359/13, 19, 630, 632; 434/43, 44; 358/104; 385/116
See application file for complete search history.

(56) References Cited

U.S. PATENT DOCUMENTS

| | | | | |
|---|---|---|---|---|
| 4,028,725 A | 6/1977 | Lewis | | 358/104 |
| 4,348,186 A | 9/1982 | Harvey et al. | | 434/44 |
| 4,479,784 A | 10/1984 | Mallinson et al. | | 434/43 |
| 4,634,384 A | 1/1987 | Neves et al. | | 434/44 |
| 5,071,209 A | 12/1991 | Chang et al. | | 359/19 |
| 5,103,306 A | 4/1992 | Weiman et al. | | 358/133 |
| 5,136,675 A | 8/1992 | Hodson | | 385/116 |
| 5,320,534 A | 6/1994 | Thomas | | 434/44 |
| 5,422,653 A | 6/1995 | Maguire, Jr. | | 345/9 |
| 5,485,172 A | * 1/1996 | Sawachika et al. | | 345/8 |
| 5,579,026 A | 11/1996 | Tabata | | 345/8 |
| 5,589,956 A | * 12/1996 | Morishima et al. | | 359/15 |
| 5,670,970 A | 9/1997 | Yamazaki | | 345/8 |
| 5,673,059 A | 9/1997 | Zavracky et al. | | 345/8 |
| 5,726,670 A | 3/1998 | Tabata et al. | | 345/7 |
| 5,751,272 A | 5/1998 | Silverbrook et al. | | 345/149 |
| 5,757,424 A | 5/1998 | Frederick | | 348/218 |
| 5,805,136 A | 9/1998 | Silverbrook et al. | | 345/149 |
| 5,808,589 A | 9/1998 | Fergason | | 345/8 |
| 5,808,594 A | 9/1998 | Tsuboyama et al. | | 345/89 |
| 5,825,539 A | * 10/1998 | Hoshi | | 359/462 |
| 5,917,460 A | 6/1999 | Kodama | | 345/8 |
| 5,936,596 A | * 8/1999 | Yoshida et al. | | 345/9 |
| 5,982,343 A | * 11/1999 | Iba et al. | | 345/8 |
| 6,101,038 A | 8/2000 | Hebert et al. | | 359/618 |
| 6,115,007 A | 9/2000 | Yamazaki | | 345/7 |
| 6,124,843 A | 9/2000 | Kodama | | 345/145 |
| 6,124,954 A | 9/2000 | Popovich et al. | | 359/13 |
| 6,140,980 A | 10/2000 | Spitzer et al. | | 345/8 |

\* cited by examiner

*Primary Examiner*—Nitin Patel

(57) ABSTRACT

A method and apparatus for displaying images are addressed to displaying differing images to the right and left eyes of a user. A right image is presented to the user's right eye by a right display, and a left image is presented to the user's left eye by a left display. When the user's brain processes the right and left images, it performs binocular summation on the two images, and perceives a composite image containing more information than either of the right and left images.

18 Claims, 10 Drawing Sheets

|   | 1 | 2 | 3 | 4 | 5 | 6 | 7 | 8 | 9 | 10 |
|---|---|---|---|---|---|---|---|---|---|---|
| A0 | O | O | O | O | O | O | O | O | | |
| A1 | O | O | O | O | O | O | O | O | O | |
| B0 | O | O | | | | | O | O | | |
| B1 | O | O | | | | | | O | O | |
| C0 | O | O | | | | | | O | O | |
| C1 | O | O | | | | | O | O | | |
| D0 | O | O | O | O | O | O | O | O | | |
| D1 | O | O | O | O | O | O | | | | |
| E0 | O | O | O | O | O | | | | | |
| E1 | O | O | | O | O | | | | | |
| F0 | O | O | | | O | O | | | | |
| F1 | O | O | | | | O | O | | | |
| G0 | O | O | | | | O | O | | | |
| G1 | O | O | | | | | O | O | | |

METHOD AND APPARATUS FOR DISPLAYING IMAGES

BACKGROUND OF THE INVENTION

1. Field of the Invention

The present invention relates to a method and apparatus for displaying images. More particularly, the present invention relates to a method and apparatus for displaying images based upon the brain's ability to perform binocular summation of differing images.

2. Related Art

Head-mounted display systems for displaying images to a user's eyes or eye are known. Conventional head-mounted display systems typically include a head-mounted portion, the head-mounted portion having image-generating devices for generating images viewable by the user. Head-mounted display systems are typically used to convey computer generated information, data from sensing devices, or programmed entertainment such as moving or still images, which are often accompanied by audio signals for reception by a user's ears. One such conventional head-mounted display system 10 is illustrated by FIGS. 1 and 2.

The conventional head-mounted display system 10 includes a head-mounted portion 12, which includes right and left image displays 16, 18 and right and left eyepiece optics 20, 22, for displaying images to a user's eyes 21, 23. A controller 25 conveys image signals to the head-mounted portion 12 via a cable 14, which right and left lines 24, 26 for conveying image signals to the right and left image displays 16, 18, respectively. The controller 25 is comprised of an image source 30, which transmits image data to a processor 28, which is then formatted for transmission to the right and left image displays 16, 18 via the lines 24, 26.

In the conventional head-mounted display system 10, the right and left image displays 16, 18 each display identical images to the right eye 21 and to the left eye 23 of a user—which is known as the "biocular" mode of displaying images. FIG. 3 illustrates a simplified example of the images displayed to the right eye 21 and the left eye 23 of a user of the conventional head-mounted display system 10. Because the images displayed to the right eye 21 and to the left eye 23 of the user are identical, the user's brain does not gain additional information from the use of two image displays above what could be obtained from the use of one image display. The information contained in the image displayed to one eye is therefore redundant to the image displayed to the other eye.

Because each of the user's eyes are presented identical images, both the right and the left image displays 16, 18 must be of relatively high resolution (i.e., having a high number of individual pixels per unit area) in order to display an image having a desired sharpness. Specifically, if an image of n×m resolution (i.e., an image formed from an n×m array of pixels) is desired to be perceived by the user's brain, each of the right and left image displays must include at least an n×m array of pixels. This is undesirable because the cost of image displays increases with increasing resolution. In addition, high resolution display signals require higher storage and processing capabilities, which further adds to the cost of the head-mounted display system 10.

An alternative conventional head-mounted display is disclosed in U.S. Pat. No. 5,726,670 to Tabata et al. Tabata discloses increasing the resolution of selected portions of a display by using multiple display apparatuses to convey overlapping images. As illustrated by FIG. 1 of Tabata, separate images (b) and (c) are combined via differing optical paths to form an image (d). While the desired degree of resolution is obtained in image (b), Tabata's apparatus requires multiple optical systems to convey the overlapping images.

Therefore, a need exists for a method of displaying images that provides an image of desired resolution, and that is not unduly expensive. A need also exists for an apparatus for displaying images of desired resolution that is not unduly expensive.

SUMMARY OF THE INVENTION

The present invention overcomes the shortcomings of the conventional art and may achieve other advantages not contemplated by the conventional art.

According to a first aspect of the invention, a method and an apparatus for displaying images are addressed to displaying images using two displays, each display being arranged to present an image to an eye of a user. A right image is displayed on a right display, the right image being generated from a first portion of a source image signal, and a left image is displayed on a left display, the left image being generated from a second portion of the source image signal. The second portion of the source image signal differs from the first portion of the source image signal, allowing the user's brain to perform binocular summation of the information contained in the right and left images to form a perceived, composite image.

According to the first aspect of the invention, each eye is presented a different image, and therefore more information from the source image signal is communicated to the user's brain than would be if both displays displayed the same image. Because the human brain can extract details from and sum the different images, the composite image has a higher perceived resolution than each of the individual right and left images.

Other aspects and advantages of embodiments of the invention will be discussed with reference to the figures and to the detailed description of preferred embodiments.

BRIEF DESCRIPTION OF THE FIGURES

FIG. 8A illustrates an image displayed by a left display according to an embodiment of the present invention.

FIG. 8B illustrates an image displayed by a right display according to an embodiment of the present invention.

FIG. 9 illustrates a hypothetical source image as displayed by a 2p×2q display.

DETAILED DESCRIPTION OF PREFERRED EMBODIMENTS

An image display device and a method of displaying images according to the present invention will be described below by way of preferred embodiments and with reference to the accompanying drawings.

Figure 1:
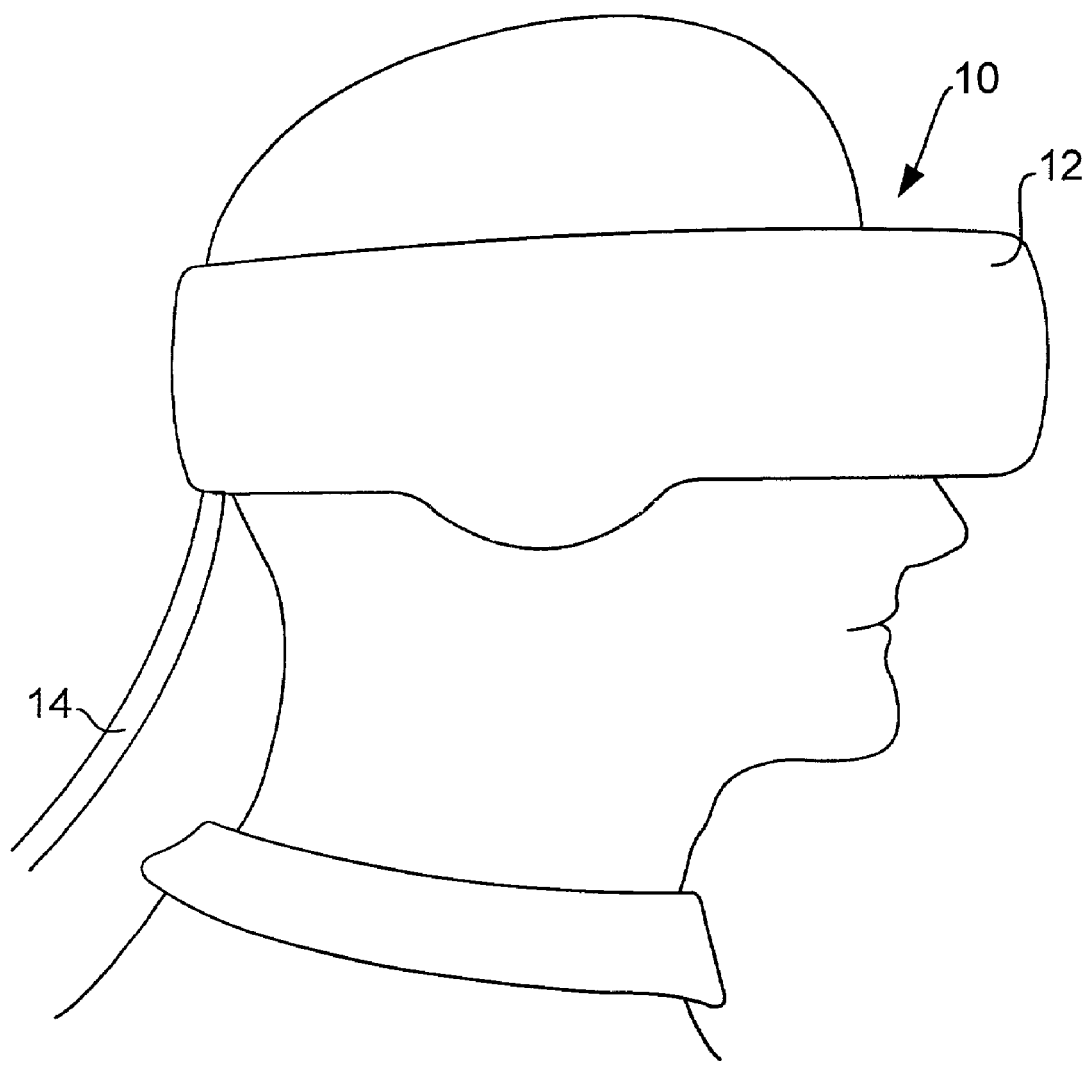
FIG. 1 illustrates a conventional head-mounted display system.
Figure 2:
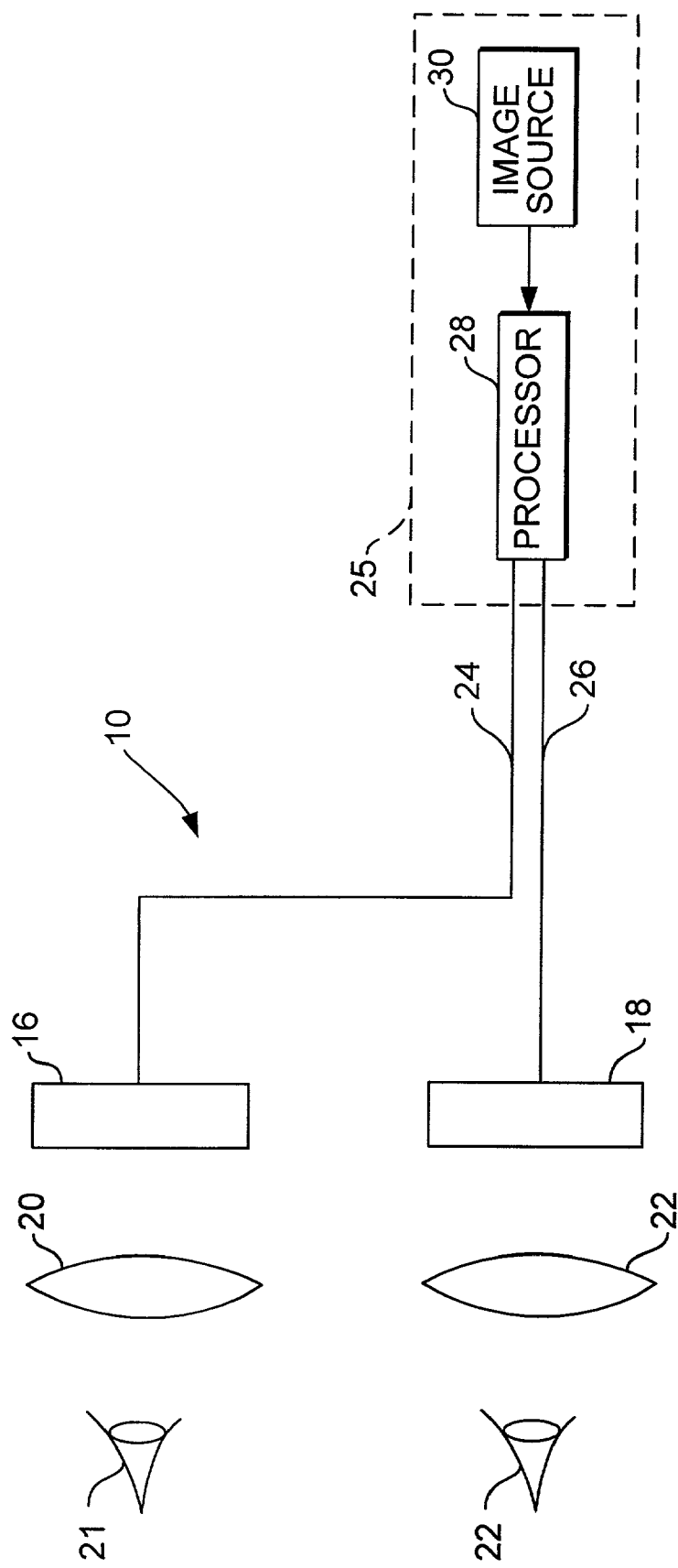
FIG. 2 is a schematic diagram of the conventional head-mounted display system of FIG. 1.
Figure 3:
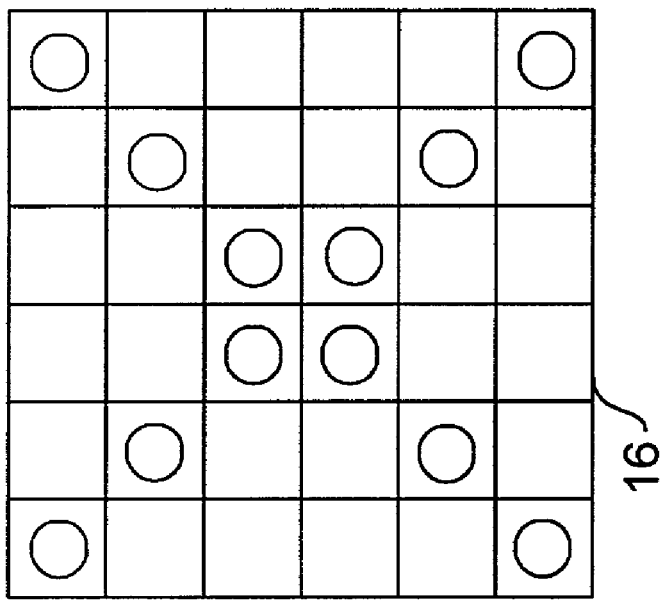
FIG. 3 illustrates the left and right images displayed by the conventional head-mounted display system of FIG. 1.
Figure 3:
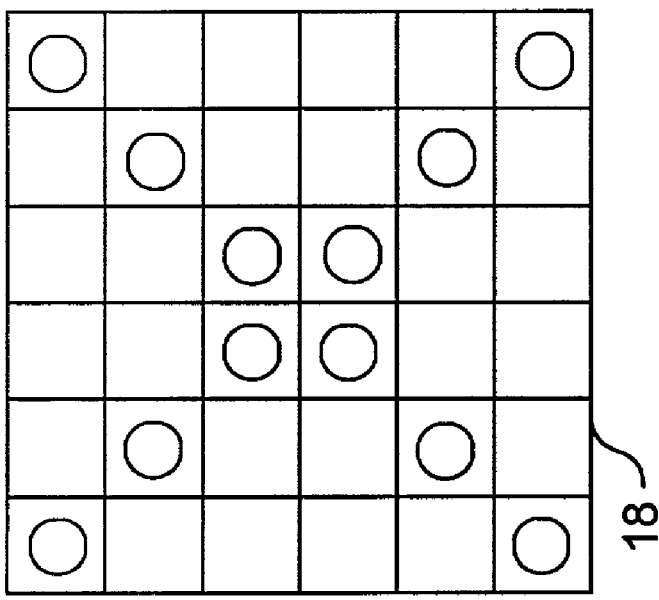
Figure 4:
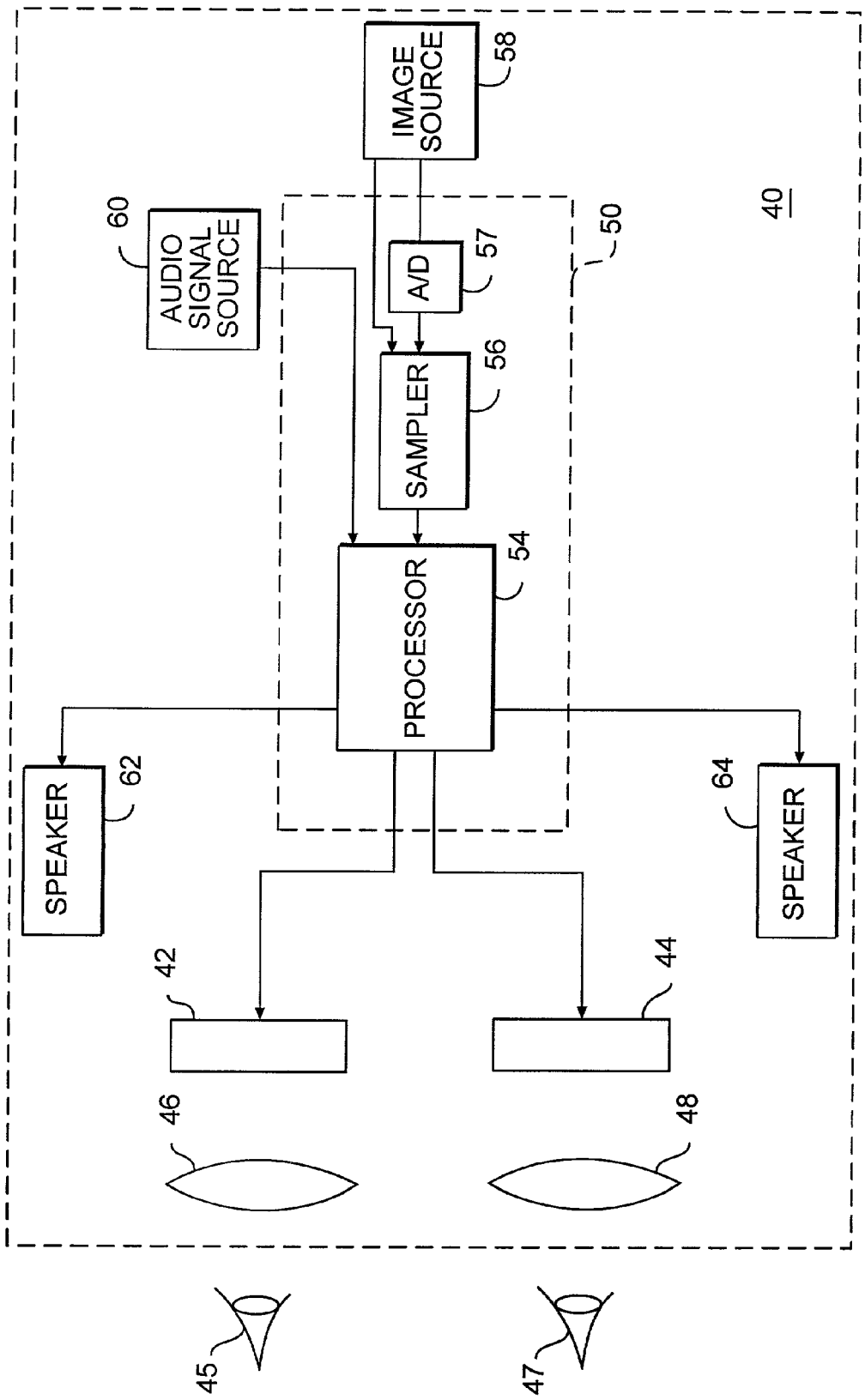
FIG. 4 is a schematic diagram of an image display device according to an embodiment of the present invention.

FIG. 4 is a schematic diagram of an image display device 40 according to an embodiment of the present invention. The image display device 40 includes a right display 42 and a left display 44, the right display 42 for displaying an image to a right eye 45 of a user, and the left display 44 for displaying an image to the user's left eye 47. A right imaging lens 46 and a left imaging lens 48 can be included to magnify or otherwise adjust the images displayed by the right and left displays 42, 44, respectively. The right and left displays 42, 44 are arranged to receive display signals from a controller 50, which is arranged to receive a source image signal from an image source 58. The controller 50 includes a processor 54, a sampler 56, and an analog-to-digital converter (ADC) 57.

Figure 5:
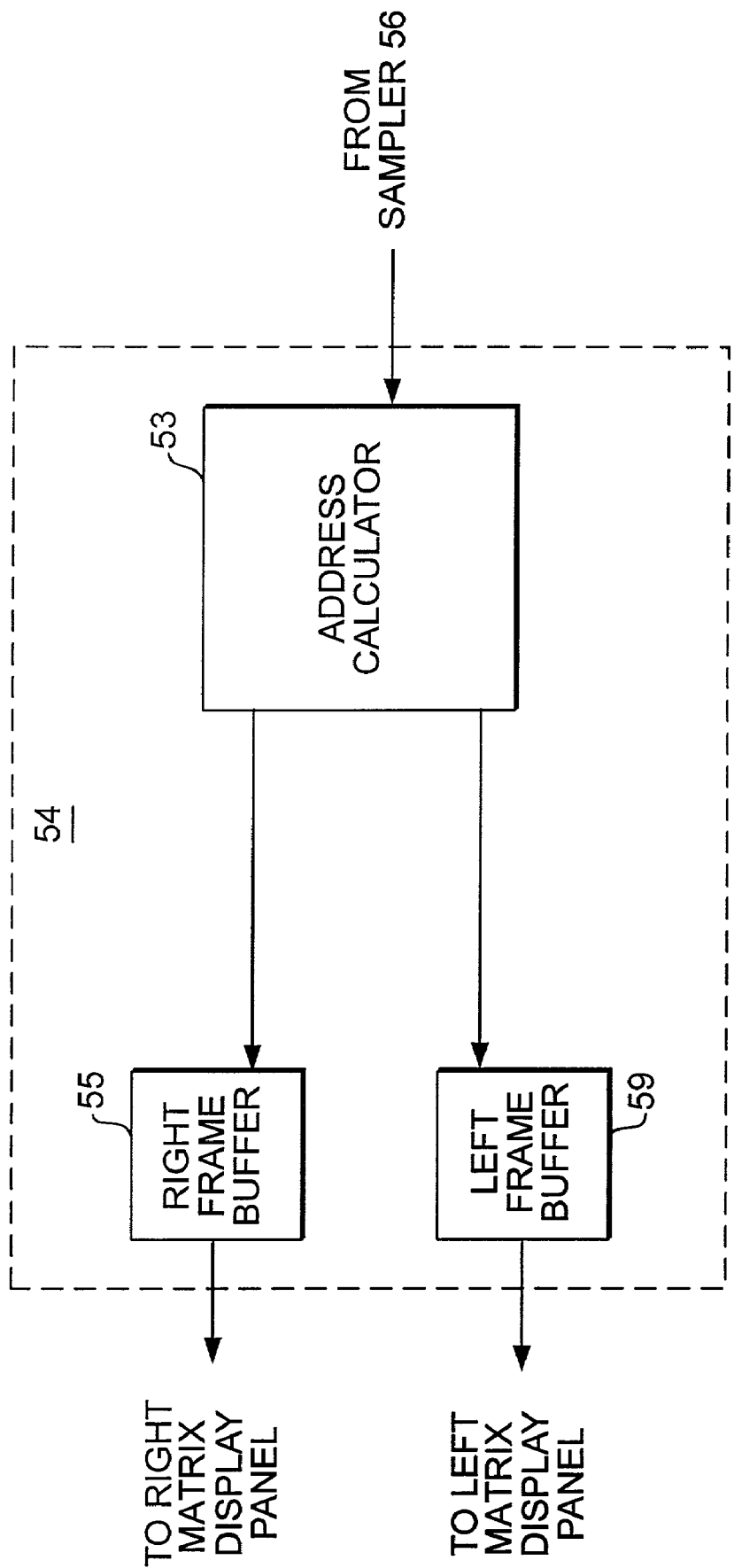
FIG. 5 illustrates a processor according to an embodiment of the present invention.

FIG. 5 is a schematic diagram illustrating the processor 54. The processor 54 comprises an address calculator 53 disposed to receive image signal data from the sampler 56, and a right frame buffer 55 and a left frame buffer 59 for receiving formatted image data from the address calculator 53.

The elements comprising the controller 50 and the processor 54 are all illustrated as individual elements for the purposes of illustration. However, one or more of these elements can comprise routines or instructions stored on and executable by, for example, a processing unit or units, software and other computer readable media used in conjunction with a computing device, and other devices capable of executing stored instructions.

The image display device 40 may also have audio capability, and an audio signal source 60 can be included to provide source audio signals to the controller 50. Speakers 62, 64 may be arranged to receive audio signals from the controller 50 and to produce audio output from the audio signals. The audio output produced by the speakers 62, 64 can be correlated with the images displayed by the displays 42, 44 in order to create, for example, a desired entertainment program for the user.

The right and left displays 42, 44 can comprise any displays capable of displaying, in general, a p×q array of individual, discrete portions of an image (e.g., a p×q array of "pixels"). In the context of head-mounted displays, displays are commonly referred to as "microdisplays." Examples of microdisplays suitable for use in the present invention include liquid crystal displays (LCDs), light emitting displays (LEDs), electro-luminance (EL) displays, electrochromic (EC) displays, and other displays capable of displaying individual pixels. Further, small scanning display devices using CRTs, and laser diodes used to create small displays, or to write directly on the retina, may also be used. According to an aspect of the invention, the image display device 40 is capable of displaying an image of a high perceived resolution (specifically, as perceived by the user's brain) to a user by taking advantage of the brain's ability to perform binocular summation of two different images, one image being presented to the user's left eye 47, and one image being presented to the user's right eye 45. "Binocular summation" refers to the brain's ability to combine two images into a single image that appears to be sharper than the individual images.

The two differing images are displayed to the right and left eyes 45, 47 using the right and left displays 42, 44, respectively. In general terms, the two differing images are produced when the processor 54 transmits a display signal to the right display 42 that is generated from only a portion of the data sampled from the source image signal, and, when the processor 54 transmits a display signal b the left display 44 that is generated from another portion of the data sampled from the source image signal. When the differing images displayed by the right and left displays 42, 44 are received by the right eye 45 and the left eye 47 of the user, respectively, the user's brain performs binocular summation of the differing images, and a composite image is perceived by the user's brain.

In the above embodiment, because the images displayed by the right and left displays 42, 44 differ, more information is conveyed to the user's brain than would be conveyed if identical images were presented to each of the user's eyes 45, 47. Therefore, in some cases, twice as much information may be conveyed to a user's brain than would be conveyed if the same image were displayed by both the right and the left displays 42, 44. The composite image as perceived by the brain therefore has a perceived resolution which is greater than that which could be conveyed by displays having the same number of pixels (p×q) using a display technique in which the same image is presented to each of the eyes 45, 47.

Figure 6:
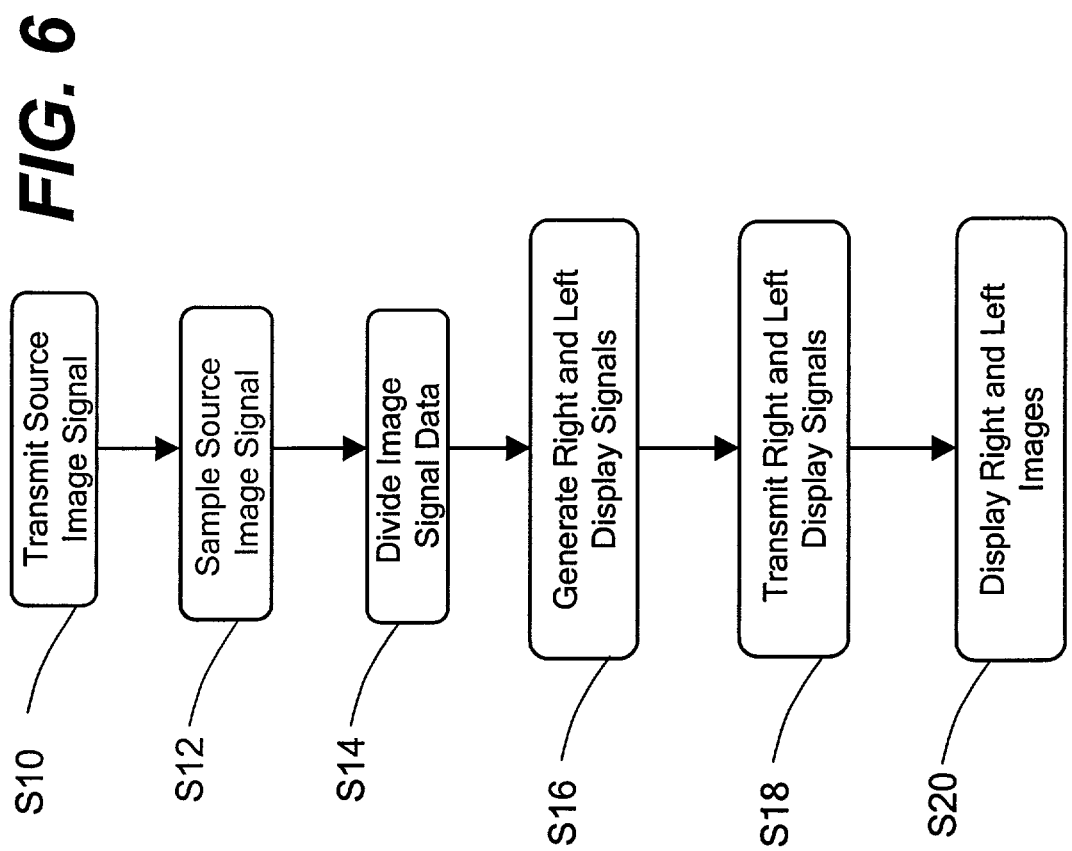
FIG. 6 is a flow chart illustrating the operation of an embodiment of the present invention.

The operation of the image display device 40 will now be discussed with reference to FIG. 6.

In step S10, the image source 58 transmits a source image signal to the sampler 56. The image source 58 can be, for example, a storage device capable of storing or buffering image data from an image generating source, a camera device for receiving actual images and reducing the images to electronic form, or, a combination of the two devices. The image source 58 can also include a digital storage system such as an optical disk or a magnetic storage disk. Alternatively, the image source 58 could include a magnetic storage tape. The term "source image signal" is used in this specification to indicate, for example, a digital or an analog signal containing data capable of describing a single frame of an image, a series of frames of images, or both. If the source image signal is an analog signal, it can be digitized at the ADC 57 before sampling. Alternatively, the source image signal could be processed in the controller 50 in the analog domain, and digitization would be unnecessary. If the source image signal provided by the image source 58 is in digital format, it can be forwarded directly to the sampler 56.

The sampler 56 samples the source image signal in step S12, and transmits the image signal data to the processor 54. In step S14, the processor 54 divides the image signal data from the sampler 56 into a first and second position of image data values. In step S16, the processor 54 uses the first and second portions of image data values to generate right and left display signals for display by the right and left displays 42, 44. The right and left display signals are transmitted to the right and left displays 42, 44, respectively, in step S18, and the right and left displays 42, 44 display right and left images in step S20.

Figures 8A, 8B, 9:
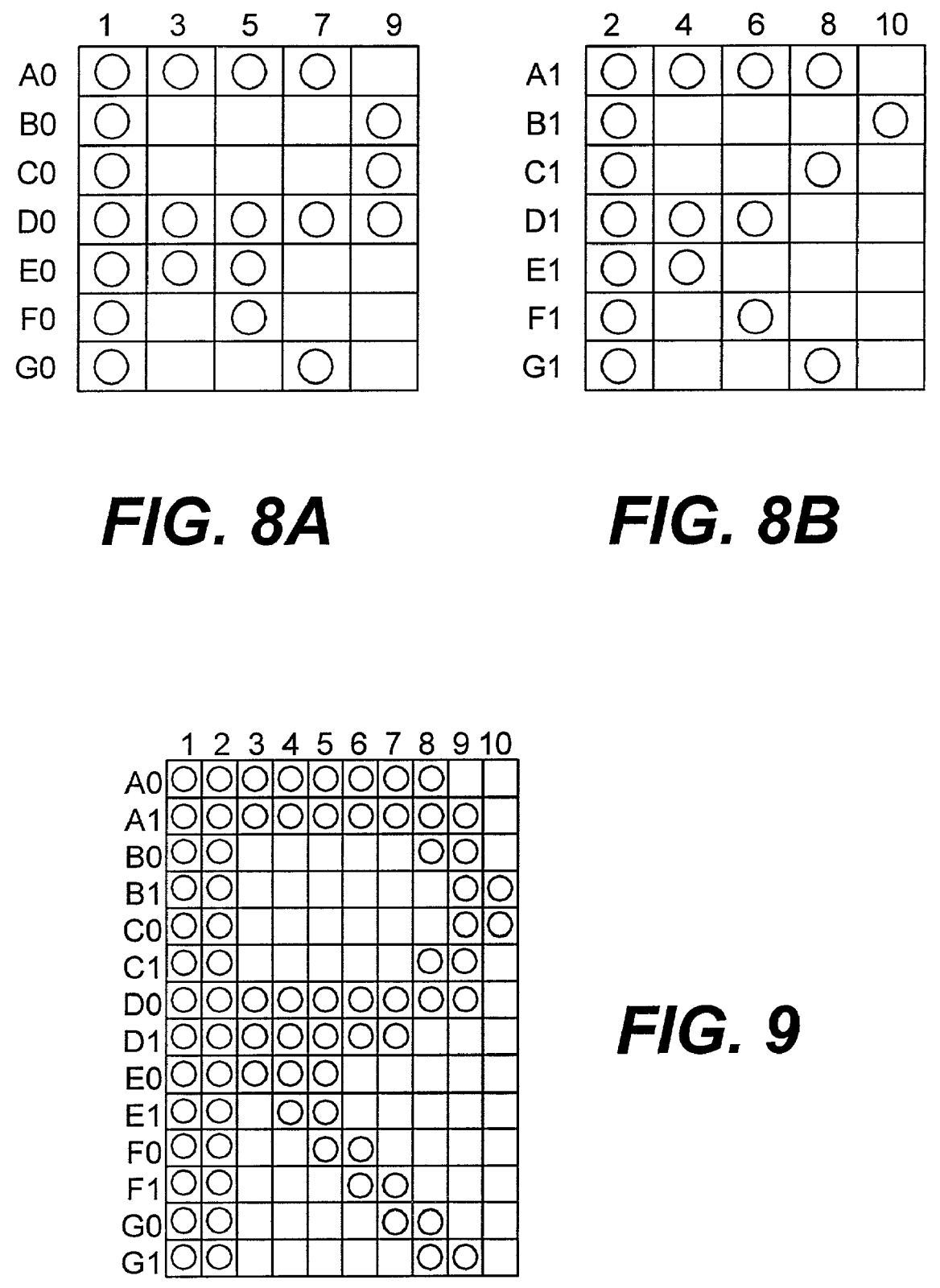

For the purposes of this discussion, the right and left displays 42, 44 are described as having p rows and q columns, forming p×q arrays of pixels. FIGS. 8A and 8B illustrate a simplified depiction of images displayed by the left display 44 and the right display 42, respectively.

In order to effectuate binocular summation, the sampler 56 samples the source image signal at a rate such that the image signal data includes a sufficient number of image data values so that differing display signals can be provided to the right p×q display 42 and to the left p×q display 44. Each image data value sampled from the source image signal includes information regarding the brightness and color of a particular pixel. In a preferred embodiment, the sampler 56 samples at a rate sufficient to generate a number of image data values to display an image of 2p×2q resolution. FIG. 9 illustrates how a displayed image would appear if all of the sampled data were used to display an image on a 2p×2q display.

Figure 10:
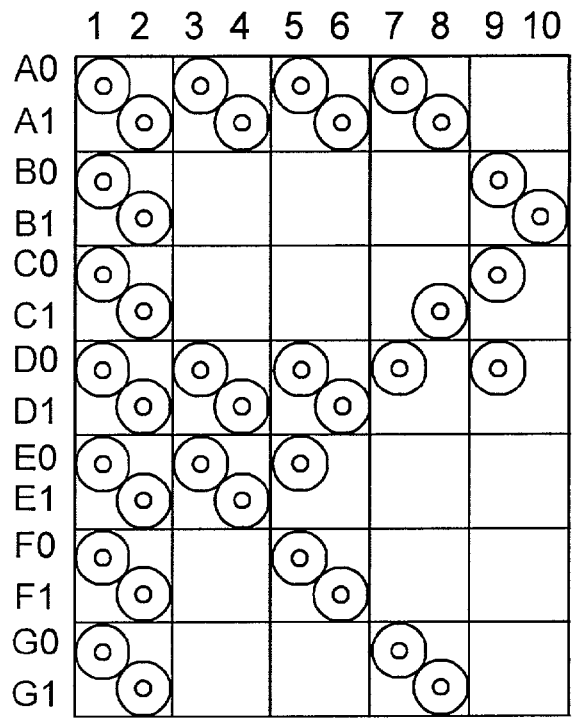
FIG. 10 illustrates a symbolic representation of a composite image perceived by a user according to an embodiment of the present invention.

According to an aspect of the present invention, the processor 54 divides the sampled image signal data into a first portion, including a right set of image data values, which is used for generating display signals for the right display 42 (FIG. 8B), and, a second portion, including a left set of image data values, which is used for generating display signals for the left display 44 (FIG. 8A). The composite image formed by binocular summation of the images of FIGS. 8A and 8B is illustrated symbolically by FIG. 10.

The source image signal preferably contains data capable of describing a series of frames of source images, and the data describing each frame can be sampled individually, with the first and second portions of the image signal data each describing a part of a frame.

According to the above embodiment, the right and left displays 42, 44 can have a relatively low resolution, with the user perceiving a composite image of higher resolution. Alternatively, displays of conventional resolution can be used in the image display device 40, and the sampler 56 can sample at a higher rate in order to provide differing display signals to the respective displays. In this way, a composite image of increased perceived resolution can be achieved using displays of conventional resolution.

The processor 54 can divide image signal data from the sampler 56 in several ways, examples of which are discussed below. While the embodiments are discussed in terms of a "source image signal," this term is not intended to limit the present invention to the display of static images. Rather, a source image signal can include image data communicating a series of frames of images, which can be converted, frame by frame, into a series of display images for display on the right and left displays 42, 44.

Figure 7:
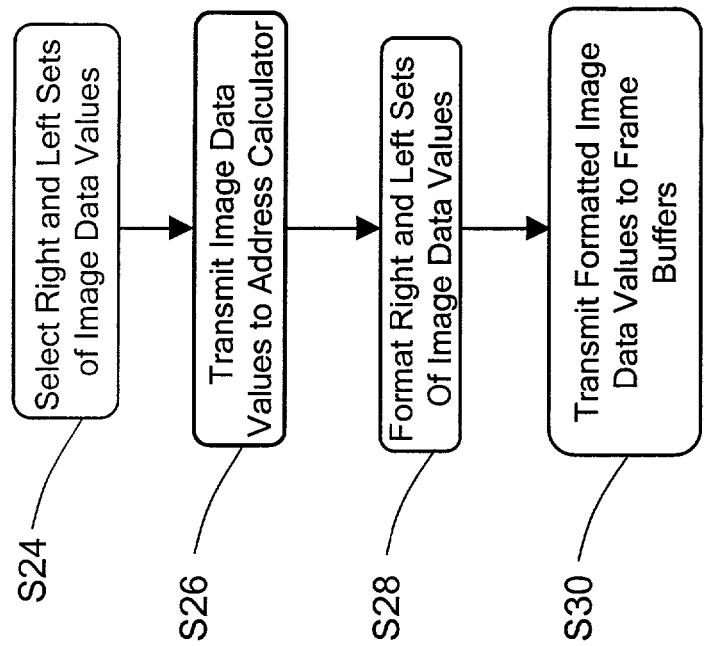
FIG. 7 is a flow chart illustrating the generation of display signals.

A first embodiment of a method of dividing image signal data and generating display signals is illustrated by FIGS. 7, 8A, 8B, 9 and 10. FIG. 7 is a flow chart illustrating the operation of the processor 54 in dividing image signal data and generating the right and left display signals. FIGS. 8A and 8B illustrate, respectively, the images to be displayed by the right and left displays 42, 44. FIG. 9 illustrates a hypothetical 2p×2q array source image, which is used to demonstrate how the right and left sets of image data values are selected. The hypothetical source image of FIG. 9 may represent, for example, a frame from image data communicated by a source image signal. In the first embodiment, data from the source image signal is sampled so as to select data from alternating columns and rows of the source image.

Referring to FIG. 7, the processor 54 divides the image signal data from the sampler 56 into first and second portions by selecting a right set of image data values and a left set of image data values in step S24, and transmitting the image data values to the address calculator 53 in step S26. The right and left display signals are generated in the address calculator 53, where first and second portions of the image data values from the image signal data, comprised by the right and left sets of image data values, respectively, are formatted by the address calculator 53 in step S28. The address calculator 53 then transmits the formatted right and left sets of image data values to the right and left frame buffers 55, 59 in step S30.

FIGS. 8B and 9 illustrate the selection of a right set of image data values. In step S24, the processor 54 selects the right set of image data using the even rows (A0, B0, . . . ) and odd columns (1, 3, . . . ) from the source image in FIG. 9. Similarly, the processor 54 selects the left set of image data values from the odd rows (A1, B1, etc.) and even columns (2, 4, . . . ) of the source image. In step S30, the formatted image data values from the right set of image data values, which form the right display signal (displayed as FIG. 8B), are transmitted to the right frame buffer 55. Similarly, the formatted image data values from the left set of image data values, which form the left display signal (displayed as FIG. 8A), are transmitted to the left frame buffer 59 in step S30. The composite image is illustrated symbolically by FIG. 10.

The right and left frame buffers 55, 59 are included so that images can be displayed by the right and left displays 42, 44 substantially simultaneously. "Substantially simultaneously" indicates that the right and left images are displayed in sufficient temporal proximity so that a user's brain perceives the right and left images to occur at the same time. Alternatively, a single frame buffer could be used to temporarily store the display signals to be transmitted to the right and left displays 42, 44.

Figure 11:
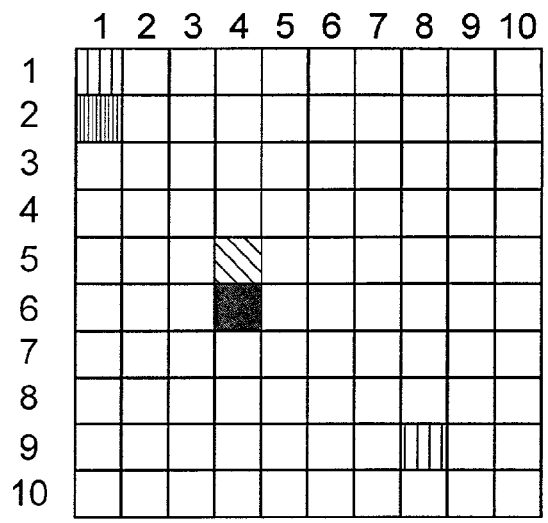
FIG. 11 illustrates a hypothetical source image as displayed on a 2u×2v display.
Figure 12A:
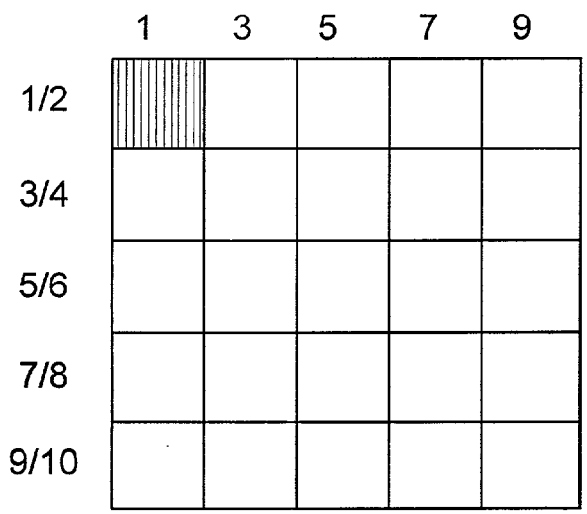
FIG. 12A illustrates an image displayed by a left display according to an embodiment of the present invention.
Figure 12B:
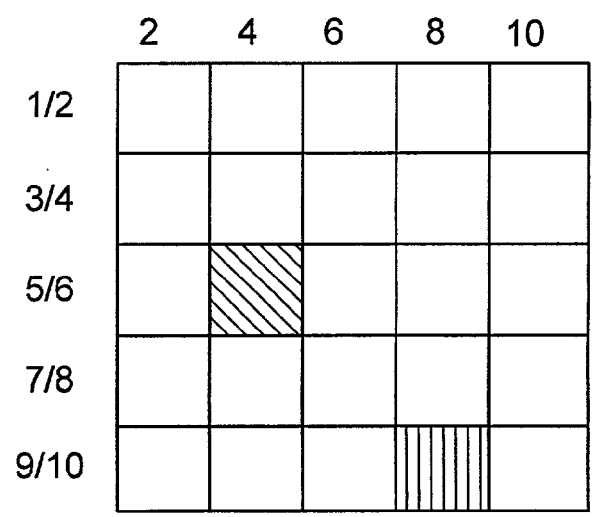
FIG. 12B illustrates an image displayed by a right display according to an embodiment of the present invention.

A second embodiment of a method of dividing the image signal data is illustrated by FIGS. 11, 12A and 12B. FIG. 11 illustrates a hypothetical 2u×2v source image for illustrating how the respective sampled image data values are selected for display on right and left displays each having u×v resolution.

In FIG. 11, the hypothetical source image signal as displayed on a 2u×2v display includes a pixel (described by an image data value) in column 1, row 1, and an adjacent pixel in column 1, row 2 (also described by an image data value). According to the second method of dividing image signal data, the two adjacent image data values are averaged, and used to fill column 1/2, row 1 in FIG. 12A. The term "column 1/2" is used to indicate that this column is produced by averaging columns 1 and 2 from FIG. 11.

In general, according to the second method, the odd columns from FIG. 11 are assigned to the left display, and the even columns are assigned the right display. Vertically adjacent image data values are averaged in order to maintain the proper aspect ratio for the displayed images on the right and left displays.

In the second method for dividing image signal data, the source image signal data is sampled at a rate sufficient to fill the 2u×2v array illustrated in FIG. 11. The second method is advantageous in that all of the data from a 2u×2v source image signal is used to form the display signals, and all of the information is conveyed to the user using only u×v displays.

A variant to the second method could include assigning alternating rows to the right and left displays, and averaging horizontally adjacent image data values.

Figure 13:
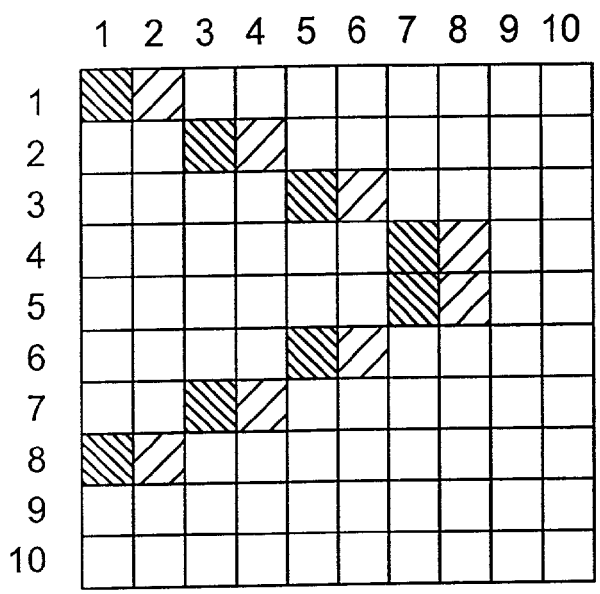
FIG. 13 illustrates a hypothetical source image as displayed on a 2w×2z display.
Figure 14A:
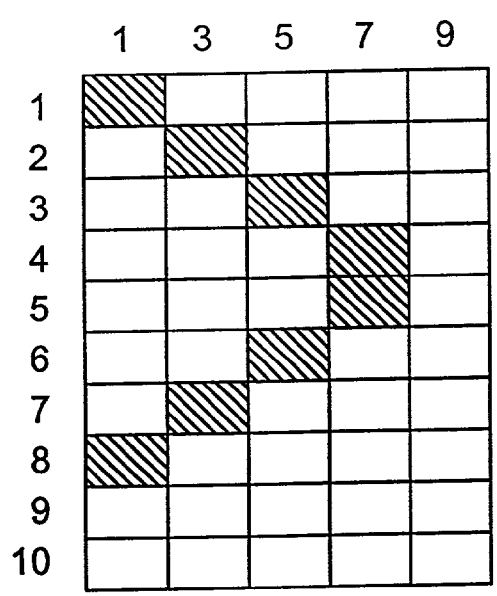
FIG. 14A illustrates an image displayed by a left display according to an embodiment of the present invention.
Figure 14B:
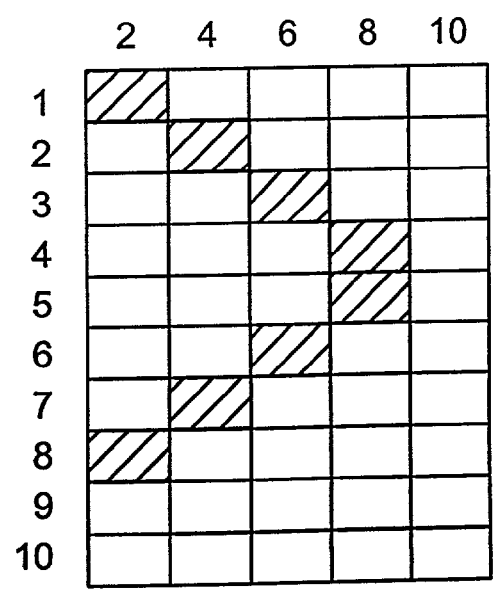
FIG. 14B illustrates an image displayed by a right display according to an embodiment of the present invention.

A third embodiment of a method of dividing the image signal data is illustrated by FIGS. 13, 14A and 14B. FIG. 13 illustrates a hypothetical 2w×2z array source image for illustrating how the respective sampled image signal data values are selected for display on right and left displays of 2w×z resolution.

According to the third embodiment of the method of dividing the image signal data, the displays used to display the images of FIG. 14A and FIG. 14B have the same vertical resolution as the hypothetical source image of FIG. 13, and half the horizontal resolution of the hypothetical source image. In filling the image of FIG. 14A, the controller uses the image data value sampled from column 1, row 1 to fill those same columns in the left display, and fills column 1, row 3 of the display with the corresponding value from FIG. 13. The right display is similarly filled.

According to the third embodiment, the user's brain performs binocular summation of the "overlapping" columns from FIGS. 14A and 14B, to arrive at an approximation of the image of FIG. 13. A composite image approximating 2w×2z resolution can therefore be achieved using displays of 2w×z resolution.

The methods of dividing image signal data discussed above are intended to be illustrative, and not exhaustive, of the possible methods of using binocular summation in creating composite images. Other techniques, such as random sampling of the source image signal and assigning random image data values for use in the right and left displays 42, 44, are also within the scope of the invention. Similarly, a single method for dividing the image signal data need not be used across the entire array of the right and left displays 42, 44, and combinations of methods of dividing the image signal data can be used to produced desired levels of resolution in specific areas of the composite image. In addition, the portions of the image signal data used to generate the display signals for the right and left displays 42, 44 need not be completely different, and image data values can be shared among the two portions.

In the above embodiments, the image display device performs sampling, and in some instances, analog-to-digital conversion of source image signals from the image source 58. These steps may not be necessary if the image source 58 provides a source image signal that already contains image data suitable for use by the processor 54. In that case, the processor 54 can simply divide the image data from the source image signal into the first and second portions necessary for generating the display signals for display by the right and left displays 42, 44. Further, while the sampling rates are discussed as being adequate to produce display signals for the right and left displays 42, 44, higher sampling rates can be employed.

In the embodiment illustrated by FIG. 4, the elements comprising the image display device 40 are shown as forming a single device 40 for the purpose of illustration, and the relationship of the elements is not intended to be limitative of the present invention. For example, FIG. 15 illustrates an alternative embodiment of an image display device having modular components.

Figure 15:
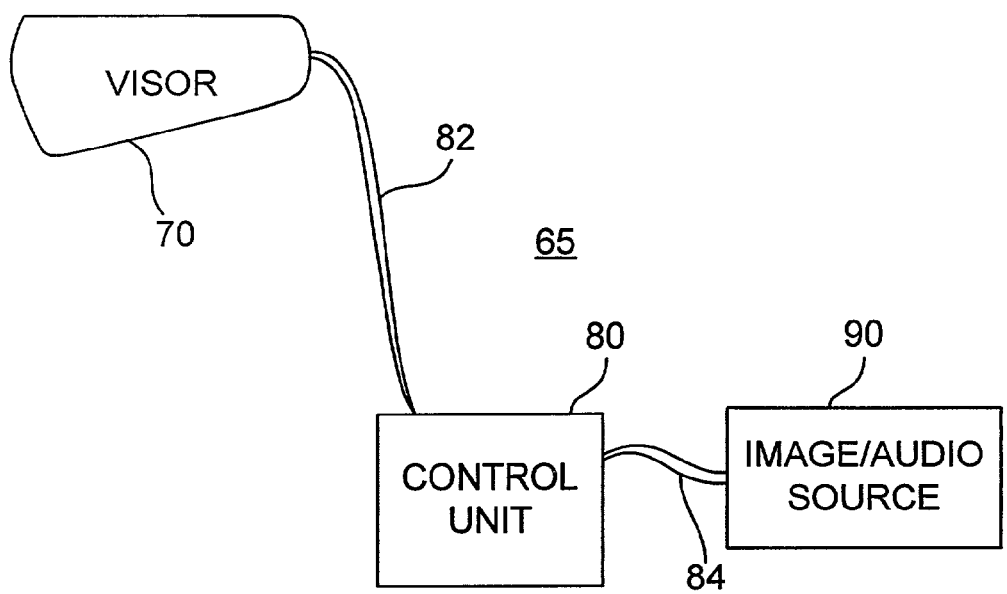
FIG. 15 illustrates an image display device according to an alternative embodiment of the present invention.

In the embodiment illustrated by FIG. 15, an image display device 65 comprises a visor component 70, which is adapted to fit over a user's head, connected to a control unit 80 by a cable 82. The visor component 70 can include, for example, right and left displays, right and left imaging lenses, and speakers. The control unit 80 can comprise a controller for providing display signals to the displays, and additional features such as, for example, functional displays, volume controls, on/off controls, and other controls. An image/audio source 90 can include an audio signal source and an image source, the source image signals and source audio signals being provided to the control unit 80 via a cable 80. It is also within the scope of the present invention to use wireless transmission of data between any of the components shown in FIG. 15.

The embodiment illustrated by FIG. 15 has the advantage of being modular. However, it is within the scope of the invention to include all or a part of the elements comprising the image display device 65 in a single unit. The image display device 65 may also take the form, for example, of a helmet to be worn by a user.

According to the above embodiments of the present invention, it is possible to enhance the perceived resolution of the image displayed by separate displays, without increasing the resolution of the displays. This advantage over conventional devices can be realized in many ways. For example, the right and left displays 42, 44 can be displays of conventional resolution, and can convey a composite image of high perceived resolution to a user.

Another method in which the present invention can be utilized is to utilize right and left displays 42, 44 of reduced resolution, yet still obtain an image of high perceived resolution. By providing differing display signals to the right and left displays 42, 44 that can be merged by binocular summation, the perceived resolution of the composite images perceived by the user is enhanced beyond the resolution that can be obtained by conventional methods.

The above embodiments of the present invention are described in the environment of head mounted displays. However, devices such as surgical imaging devices, electronic binoculars, or any image forming device that presents separate images to a right and a left eye of a user, are suitable to employ the concepts of the present invention.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method of displaying images using an image display device having two displays, each display being arranged in the image display device so as to be capable of presenting an image to an eye of a user, the method comprising:

dividing image signal data into a first portion, the first portion comprising a first reduced data set defining the entire image, and a second portion, the second portion comprising a second reduced data set defining the entire image, the first portion differing from the second portion;

generating a right display signal using the first portion of the image signal data;

generating a left display signal using the second portion of the image signal data;

transmitting the right display signal to a right one of the displays;

transmitting the left display signal to a left one of the displays;

displaying a right image on the right display from the right display signal; and displaying a left image on the left display from the left display signal, substantially simultaneously with the displaying of the right image;

wherein the image signal data includes data capable of describing a source image arrangeable into an array of columns and rows, the step of dividing image signal data comprising:

selecting a right set of image data values from the image signal data corresponding to selected points on the array of the source image, the right set of image data values being used to form the first portion of the image signal data; and selecting a left set of image data values from the image signal data corresponding to selected points on the array of the source image, the left set of image data values differing from the right set of image data values, and being used to form the second portion of the image signal data;

wherein the step of selecting a left set of image data values includes the step of selecting image data values of which none are included in the right set of image data values.

2. The method of claim 1, wherein the step of the step of dividing image signal data comprises:

transmitting the right and left sets of image data values to an address calculator.

3. The method of claim 1, wherein the step of generating a right display signal comprises:

formatting the right set of image data values.

4. The method of claim 3, wherein the step of generating a left display signal comprises:

formatting the left set of image data values.

5. The method of claim 1, wherein the step of displaying a right image on the right display comprises the step of displaying a right image of n×m resolution, and the step of displaying a left image on the left display comprises the step of displaying a left image of n×m resolution, wherein n and m are integers.

6. The method of claim 1, comprising;

sampling a source image signal to produce the image signal data.

7. The method of claim 6, wherein the step of sampling a source image signal comprises:

sampling a frame of the source image signal to produce the image signal data.

8. An image display device, the device comprising:

a controller arranged to utilize a first portion of image signal data to generate a right display signal, and to utilize a second portion of image signal data to generate a left display signal, the first portion of the image signal data and the second portion of the image signal data being obtained from a source image signal, the first portion comprising a first reduced data set defining the entire image, and the second portion comprising a second reduced data set defining the entire image;

a right display operably connected to the controller to receive the right display signal and to utilize the right display signal to display a right image to a right eye of a user; and a left display operably connected to the controller to receive the left display signal and to utilize the left display signal to display a left image to a left eye of a user, wherein the right display signal differs from the left display signal.

9. The image display device of claim 8, further comprising:

an image source for generating the source image signal.

10. The image display device of claim 8, wherein the controller comprises:

a sampler, the sampler being disposed to receive the source image signal from the image source and to generate image signal data therefrom.

11. The image display device of claim 8, wherein the image source includes a digital storage medium.

12. The image display device of claim 8, further comprising:

a right lens disposed to modify the image displayed by the right image display; and a left lens disposed to modify the image displayed by the left image display device.

13. A method, comprising:

generating first and second sets of pixels from an input image using different portions of the input image; and providing the first and second sets of pixels to a left eye display and right eye display, respectively;

wherein the input image comprises an array of pixels having rows and columns, and wherein generating the first and second sets of pixels comprises selecting different rows and columns of the input image when generating the first set of pixels than when generating the second set of pixels.

14. A method, comprising:

generating first and second sets of pixels from an input image using different portions of the input image; and providing the first and second sets of pixels to a left eye display and right eye display, respectively;

wherein the input image comprises an array of pixels having rows and columns, and wherein generating the first and second sets of pixels comprises selecting different columns from the input image when generating the first set of pixels than when generating the second set of pixels.

15. The method of claim 14 wherein generating the first and second sets of pixels also comprises averaging pixels in adjacent rows.

16. An image display device, comprising:

a left eye display;

a right eye display; and a controller coupled to the left and right eye displays, wherein the controller receives an input image and, from the input image, generates a left eye image to be shown on the left eye display and a right eye image to be shown on the right eye display;

wherein the controller generates the left and right eye images using portions of the input image, wherein the portion use to generate the left eye image differs from the portion used to generate the right eye image;

wherein the input image comprises an array of pixels having rows and columns, and wherein the controller selects different columns of the input image when generating the left eye image than when generating the right eye image.

17. The image display device of claim 16 wherein the controller also averages pixels in adjacent rows when generating the left and right eye images.

18. An image display device, comprising:

a left eye display;

a right eye display; and a controller coupled to the left and right eye displays, wherein the controller receives an input image and, from the input image, generates a left eye image to be shown on the left eye display and a right eye image to be shown on the right eye display;

wherein the controller generates the left and right eye images using portions of the input image, wherein the portion use to generate the left eye image differs from the portion used to generate the right eye image;

wherein the input image comprises an array of pixels having rows and columns, and wherein the controller selects different rows and columns of the input image when generating the left eye image than when generating the right eye image.

* * * * *

UNITED STATES PATENT AND TRADEMARK OFFICE
CERTIFICATE OF CORRECTION

PATENT NO. : 7,091,929 B2  Page 1 of 1
APPLICATION NO. : 09/809213
DATED : August 15, 2006
INVENTOR(S) : Barry Bronson It is certified that error appears in the above-identified patent and that said Letters Patent is hereby corrected as shown below:

In column 4, line 64, delete "position" and insert -- portion --, therefor.

In column 9, line 23, in Claim 2, after "the step of" delete "the step of".

In column 9, line 39, in Claim 6, after "comprising" delete ";" and insert -- : --, therefor.

Signed and Sealed this

Fifth Day of May, 2009

JOHN DOLL
*Acting Director of the United States Patent and Trademark Office*